(12) United States Patent
Vitali

(10) Patent No.: US 8,221,042 B2
(45) Date of Patent: Jul. 17, 2012

(54) ANTI-ROTATION FASTENER FOR AN AUTOMOTIVE COMPONENT AND PANEL

(75) Inventor: Robert Vitali, Sterling Heights, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 140 days.

(21) Appl. No.: 12/398,408

(22) Filed: Mar. 5, 2009

(65) Prior Publication Data

US 2010/0223765 A1    Sep. 9, 2010

(51) Int. Cl.
*F16B 19/00* (2006.01)
(52) U.S. Cl. ......................................... 411/510
(58) Field of Classification Search .......... 411/510, 411/913, 338, 339; 24/297
See application file for complete search history.

(56) References Cited

U.S. PATENT DOCUMENTS

| | | | |
|---|---|---|---|
| 2,560,961 A | 7/1951 | Knohl | |
| 3,271,059 A | 9/1966 | Pearson | |
| 3,693,494 A | 9/1972 | Meyer | |
| 3,810,279 A * | 5/1974 | Swick et al. | 411/509 |
| D268,006 S * | 2/1983 | Wollar | D8/393 |
| D268,894 S * | 5/1983 | Wollar | D8/385 |
| D269,759 S * | 7/1983 | Wollar | D8/388 |
| 4,396,329 A * | 8/1983 | Wollar | 411/508 |
| 4,865,281 A * | 9/1989 | Wollar | 248/71 |
| 4,936,530 A * | 6/1990 | Wollar | 248/71 |
| 4,993,903 A | 2/1991 | Kraus | |
| 5,203,529 A | 4/1993 | Penniman | |
| 5,289,621 A | 3/1994 | Kaneko | |
| 5,306,098 A * | 4/1994 | Lewis | 411/510 |
| 5,324,151 A | 6/1994 | Szudarek et al. | |
| 5,333,822 A | 8/1994 | Benoit et al. | |
| 5,362,018 A | 11/1994 | Darr et al. | |
| 5,368,261 A | 11/1994 | Caveney et al. | |
| 5,373,611 A * | 12/1994 | Murata | 24/297 |
| 5,636,937 A | 6/1997 | Zemlicka | |
| 5,651,652 A | 7/1997 | Williams et al. | |
| 5,658,046 A | 8/1997 | Rus | |
| 5,672,038 A | 9/1997 | Eaton | |
| 5,718,025 A * | 2/1998 | Courtin | 24/453 |
| 5,799,906 A | 9/1998 | Hillegonds | |
| 5,907,891 A * | 6/1999 | Meyer | 24/453 |
| 5,921,510 A | 7/1999 | Benoit et al. | |
| 6,076,781 A * | 6/2000 | Kraus | 248/73 |
| 6,203,364 B1 | 3/2001 | Chupak et al. | |
| 6,305,892 B1 * | 10/2001 | Qiao | 411/508 |
| 6,398,169 B1 * | 6/2002 | Streit | 248/71 |
| 6,511,030 B1 | 1/2003 | Kelley | |
| 6,520,704 B1 * | 2/2003 | Vidmar et al. | 403/188 |

(Continued)

*Primary Examiner* — Flemming Saether
(74) *Attorney, Agent, or Firm* — Brooks Kushman P.C.; Frank MacKenzie

(57) ABSTRACT

An automotive fastener for insertion into a slotted aperture is provided with a head, a base with an elongated cross-section sized to fit within the slotted aperture for limiting rotation of the base therein, a first array of fins, and a second array of fins offset axially from the first array of fins. The fins in each array extend along respective peripheral regions of the base. The first region is less than half of the base perimeter and spaced apart and opposed from the second region. A automotive fastener for insertion into a slotted aperture is provided with means for connecting a component to a panel; and means for inserting the fastener into the slotted aperture, the means sized to fit and limit rotation therein. The fastener has first and second retainer means for retaining the fastener in the aperture; the second retainer means offset axially from the first means.

18 Claims, 5 Drawing Sheets

U.S. PATENT DOCUMENTS

| | | |
|---|---|---|
| 6,652,206 B2 | 11/2003 | Heflin et al. |
| 6,669,426 B1 | 12/2003 | Detter et al. |
| 6,676,177 B2 | 1/2004 | Daoud et al. |
| 6,719,513 B1 * | 4/2004 | Moutousis et al. ........... 411/510 |
| 6,752,576 B2 | 6/2004 | Johansson et al. |
| 6,799,931 B2 | 10/2004 | Kwilosz |
| 6,916,145 B2 | 7/2005 | Lydan |
| 6,994,504 B2 | 2/2006 | Gordon |
| 7,055,783 B2 | 6/2006 | Rosemann et al. |
| 7,178,206 B2 | 2/2007 | Kuhnle et al. |
| 7,179,013 B2 | 2/2007 | Benedetti |
| 7,503,528 B2 * | 3/2009 | Adams et al. ................... 248/71 |
| 2005/0242247 A1 * | 11/2005 | Geiger ........................ 248/74.3 |

* cited by examiner

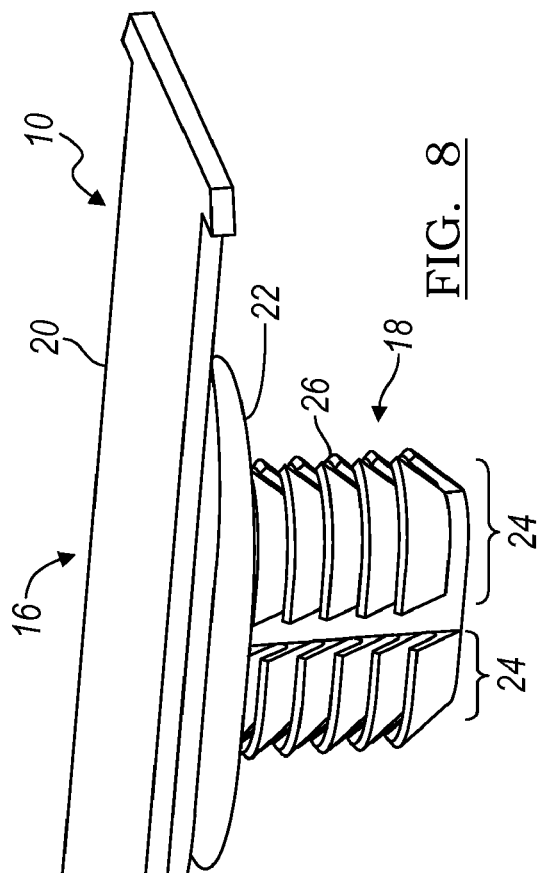
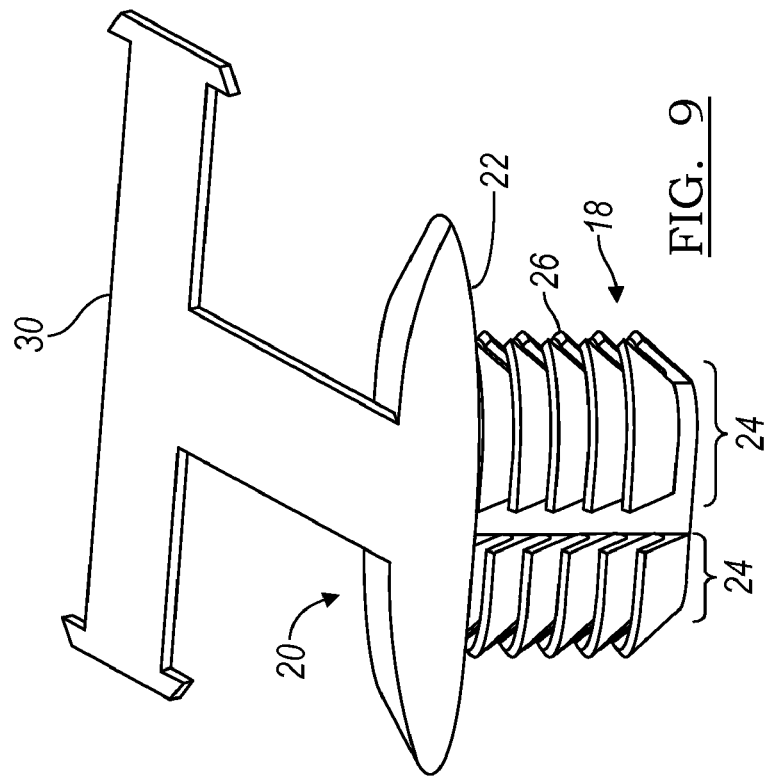

ANTI-ROTATION FASTENER FOR AN AUTOMOTIVE COMPONENT AND PANEL

BACKGROUND

1. Technical Field

The invention relates to a fastener to connect an automotive component to an automotive panel.

2. Background Art

The prior art has offered various fasteners for connecting an automotive part or component to an automotive panel. Examples of these fasteners include bolts, screws, retainers, and clips. Automotive panel fasteners also include a push-in or snap-in clip made from a plastic material which is insertable into a hole or aperture in the panel and are designed such that a fin or other portion of the base of the fastener retains the fastener in the panel aperture after it has been inserted into the aperture. These panel fasteners are usually insertable into the panel by applying an external force to the fastener and are usually lower in cost than a metal fastener, but not necessarily reusable. The fastener can have a range of connector heads extending from its base for attaching various automotive parts such as a wiring harness or other component to an automotive panel.

Continual efforts in the automotive industry have been made towards reducing the amount of noise in the cabin of the vehicle. This noise is commonly caused by vibrations or "buzz, squeak, and rattle" (BSR). Many of the previous fasteners have allowed for movement of the fastener or noise to pass through the aperture where the fastener is located. Another common problem with these fasteners is that they can rotate or spin in the aperture with respect to an automotive panel, causing problems with the automotive component they are attaching to the panel, such as misalignment or tangling. The fasteners are often difficult to reuse and need replacement during vehicle maintenance and service or other operations requiring removal of the fastener from the panel.

SUMMARY

An embodiment of the present invention discloses a fastener for insertion into a slotted aperture in an automotive panel. The fastener has a head portion for connecting an automotive component to the automotive panel and a base with an elongated cross-section extending from the head portion. The base of the fastener is sized to fit within the slotted aperture to limit rotation of the base within the aperture. The fastener is also provided with a first array of fins extending outward from the base and towards the head portion, each fin of the first array extends along a first peripheral region of the base. A second array of fins is provided and extends outward from the base and towards the head portion of the fastener, each fin of the second array extends along a second peripheral region of the base and the second array of fins is offset axially from the first array of fins.

Another embodiment of the invention discloses a fastener for insertion into a slotted aperture in an automotive panel, the fastener having a head portion for connecting an automotive component to the automotive panel and a base with an elongated cross-section extending from the head portion. The base of the fastener is sized to fit within the slotted aperture to limit rotation of the base within the aperture. The fastener is also provided with a first array of fins extending outward from the base and towards the head portion, each fin of the first array extends along a first peripheral region of the base, where the first peripheral region is less than half of the perimeter of the base. The fastener is also provided with a second array of fins extending outward from the base and towards the head portion, each fin of the second array extends along a second peripheral region of the base, where the second peripheral region being opposed from and spaced apart from the first peripheral region.

Yet another embodiment of the invention discloses a fastener for insertion into a slotted aperture of an automotive panel. The fastener is provided with means for connecting an automotive component to the automotive panel. The fastener is also provided with means for inserting the means for inserting the fastener into the slotted aperture of the panel, where the means are sized to fit and limit rotation of the fastener in the aperture of the panel. The fastener is provided with both a first retainer means and a second retainer means for retaining the fastener in the aperture. The second retainer means is offset axially from the first retainer means.

BRIEF DESCRIPTION OF THE DRAWINGS

FIG. 8 is a perspective view of a fastener according to yet another embodiment of the present invention; and FIG. 9 is a perspective view a fastener according to another embodiment of the present invention.

DETAILED DESCRIPTION OF THE EMBODIMENT(S)

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
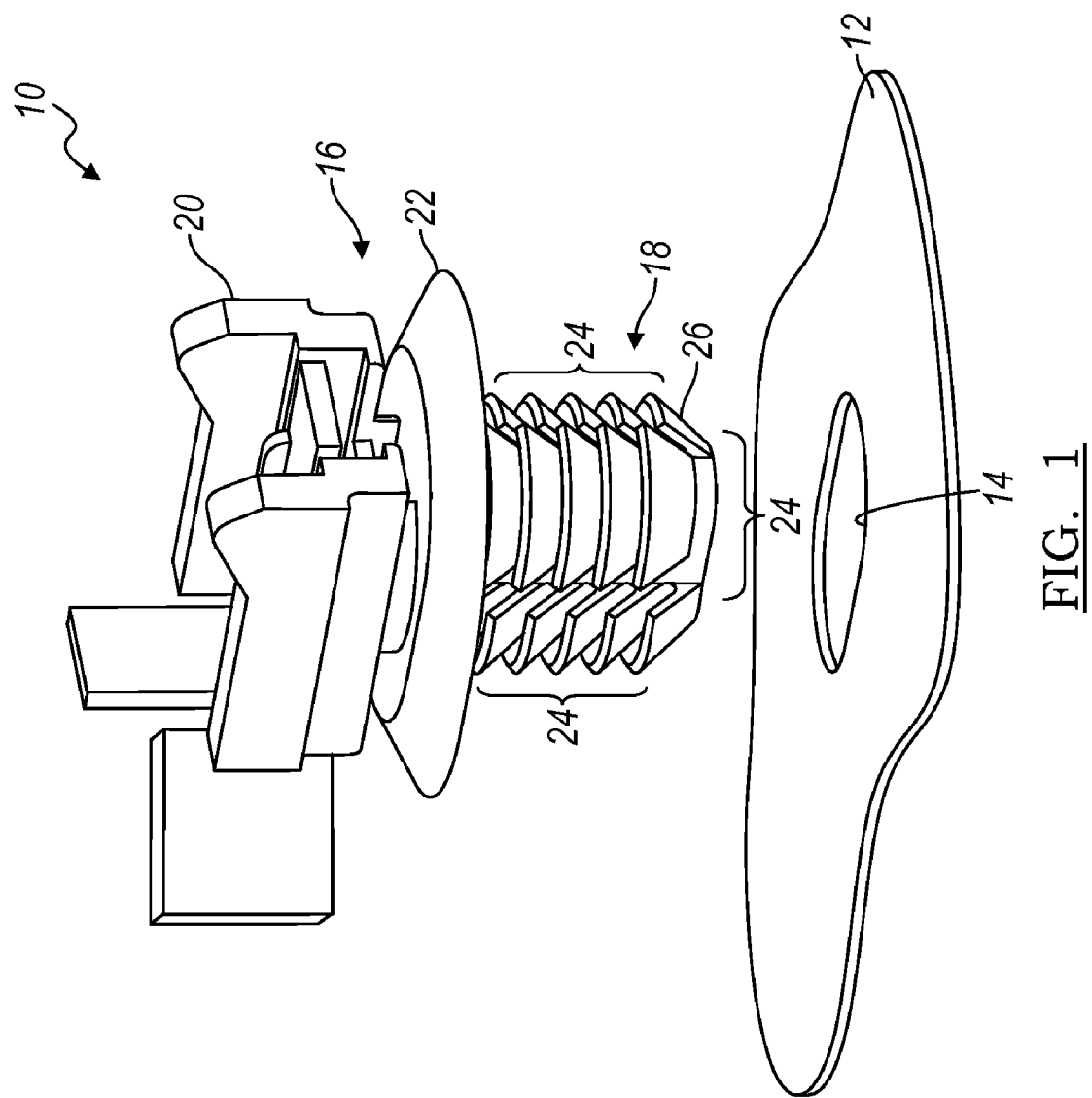
FIG. 1 is an exploded view of a slotted aperture in a panel and a fastener according to an embodiment of the present invention.
Figure 2:
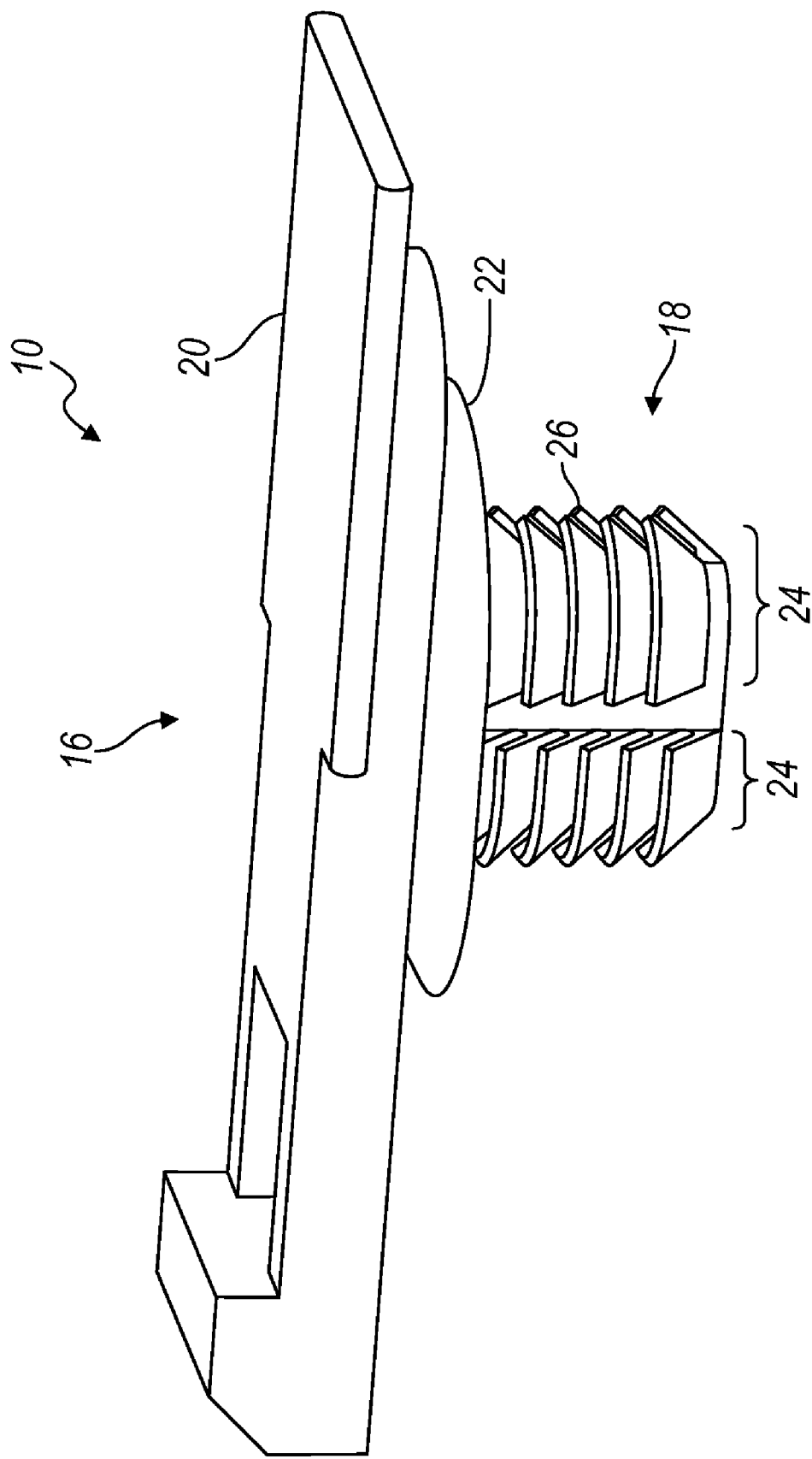
FIG. 2 is a perspective view of a fastener according to another embodiment of the present invention.

Referring now to FIG. 1, a fastener 10 is illustrated. The fastener 10 attaches to an automotive panel 12 by insertion through an aperture 14 located in the panel 12. In one embodiment, the aperture 14 is slotted. The slot can have differently shaped outer perimeters such as ovoid, elongated ovoid, rectangular with rounded ends, or other similar variations.

The fastener 10 has a head portion 16 connected to a base portion 18. A connector 20 may be attached to the head portion 16. The connector 20 is used for attachment of a wiring harness, hose, piece of automotive trim, or other automotive component. In this embodiment, the connector 20 has a cable tie extending from it and would be used to affix a wiring harness to the panel 12. Between the head portion 16 and the base portion 18 is a flange 22. The base portion 18 is inserted through the aperture 14 of the panel 12 to attach the fastener 10 to the panel 12. In one embodiment, the base portion 18 has four arrays of fins 24. The base portion 18 of the fastener 10 has an elongated cross section which has been sized to fit within the slotted aperture to assist in eliminating rotation of the base portion 18 within the aperture 14 and the fastener 10 with respect to the panel 12.

The flange 22 is sized such that it will cover the remaining open portion of the aperture 14 and a portion of the panel 12 surrounding the aperture 14 upon insertion of the base portion 18 of the fastener 10 into the aperture 14. The flange 22 may be compressed against the panel 12 surface when the fastener 10 is inserted. The compression of the flange 22 is retained after insertion and creates a potential seal of the flange 22 against the panel 12 surface, which helps to prevent the fastener 10 from translating in the aperture 14. Additionally, dust, air, noise, or BSR may be at least partially prevented or mitigated by the flange 22 interacting with the panel 12 surface and blocking of the aperture 14. This mitigation can be beneficial when the fastener 10 and panel 12 are adjacent to a vehicle occupant cabin in the automobile.

In one embodiment, there are four arrays of fins 24 located on the base portion 18. Each array of fins 24 may extend along a peripheral region of the base 18. In one example, a peripheral region of the base 18 is less than one-fourth of the outer perimeter of the elongated cross-section of the base 18 discussed previously. The peripheral region may sometimes be considered one quadrant of the perimeter of the elongated cross-section of the base portion 18. Each array of fins 24 has at least one fin 26 and usually contains multiple fins 26. These fins 26 extend outward from the base portion 18 and upwards towards the head portion 16 of the fastener 10. The orientation of the fins 26 assists in firmly attaching the fastener 10 to the panel 12 or sealing the fastener 10 to the panel 12 through the aperture 14 with a compression fit. The fins 26 orientation may provide a force on one side of the panel 12 and the flange 22 may provide a force on the opposing side of the panel 12.

In one embodiment, fins 26 of a first array of fins 24 are offset from the fins 26 in adjacent arrays 24 such that the fins 26 in every other array of fins 24 are aligned similarly. For example, if a fastener 10 has a first, second, third and fourth array of fins 24 arranged sequentially around the base portion 18 of the fastener 10, the first array and third array of fins 24 are opposed from one another, and the fins 26 of these arrays 24 have corresponding incremental spacing and alignment along the longitudinal axis of the fastener 10. The second array of fins and fourth array of fins 24 have corresponding incremental spacing and alignment of their respective fins 26. The second and fourth arrays 24 oppose one another and their fins 26 are offset from the location along the longitudinal axis of the fins 26 of the first and third arrays 24. Due to this offset of fins 26 between the different arrays 24, fins 26 in two of the arrays 24 interact with the panel 12 at a given axial position of the fastener 10 when extracting the fastener 10 from the aperture 14 in the panel 12.

In the example as given above, corresponding fins 26 in the first and third arrays 24 interact simultaneously with the panel while the fins 26 in the second and fourth arrays 24 do not interact with the panel surface at that axial position for the fastener 10. Alternatively, the fins 26 in the second and fourth arrays 24 interact with the panel 12 surface during fastener 10 extraction from the aperture 14 at a given axial position, while the fins 26 in the first and third arrays of fins 24 are not interacting at that given instant. The offset between fins 26 of adjacent arrays of fins 24 may be half of the incremental spacing between the fins 26 of one of the arrays 24 or a different offset could be used. A range of incline angles 28 for the fin 26 is contemplated within the spirit and scope of the invention. The incline angle 28 is the acute angle between the longitudinal axis and the fin 26, and is nominally between thirty and sixty degrees. In certain applications, it may be desirable to have this angle be less than thirty degrees or greater than sixty degrees based on the extraction force desired, the fastener material properties, or the relative sizes of the base portion 18, aperture 14, and fins 26.

For the fastener 10 above with four arrays 24, opposing arrays 24 have similar fin 26 spacing and axial position such that upon removal of the fastener 10 from the panel 12, fins 26 in opposing arrays 24 interact with the panel 12 surface upon removal of the fastener 10 at a given axial position. Fins 26 in adjacent arrays of fins 24 do not interact with the panel 12 surface at that same given axial position. Having fins 26 offset in this manner may allow for a nominally lower extraction or removal force of the fastener 10 from the panel 12. Also, the elongated cross-sectional shape of the base portion 18, which has been sized to mimic the aperture 14 shape for insertion into it, prevents the fastener from rotating or spinning with respect to the panel 12. This feature is useful when the connector 20 is used to attach a wiring harness or other automotive component to the panel by preventing rotation or movement of the component with respect to the panel 12 and further limiting noise.

The fastener 10 may be designed such that in an automotive application it has a lifetime of three insertions and corresponding extractions from the panel 12 and the aperture 14. This allows for multiple uses of the fastener 10 during service applications of the vehicle. One way to facilitate the reusability of the fastener 10 is to fabricate it from a plastic or other material with similar properties. In one specific application, the fastener is made from a polyamide material and in that subset it is formed from an impact modified nylon.

The fastener 10 may have a different arrangement of the arrays of fins 24 along its base portion 18. In this embodiment, the first array 24 extends along the base portion 18 and each fin 26 of the first array 24 extends along a first peripheral region. The first peripheral region is less than or equal to half of the outer perimeter of the elongated cross-section of the base 18 taken along a lateral plane to the fastener 10. The fins 26 of the first array 24 extend outward from the base 18 and towards the head portion 16. A second array 24 also extends along the base portion 18 of the fastener 10. Each fin 26 of the second array 24 extends along a second peripheral region of the base. The second peripheral region is spaced apart from and opposite to the first peripheral region. The fastener 10 may also have a third and fourth array of fins 24. The third array of fins 24 is located between the first and second array of fins 24, where the fins 26 of the third array of fins 24 extend along a third peripheral region of the base. The fourth array of fins 24 is located in its respective peripheral region opposed from the third array of fins 24 and between the first and second arrays of fins 24. In this embodiment, the fastener 10 may have a flange 22 between the head portion 16 and the base portion 18 extending radially outwards from the fastener 10 in order to engage the panel 12 surface upon insertion of a fastener 10 into the aperture 14.

In FIGS. 2-6, a different embodiment of the fastener 10 is shown with an automotive connector piece 20 for use with a different automotive component attached to the head portion 16 The connector 20 is used as a snap fitting to another piece that is attached to a trim component.

Figure 4:
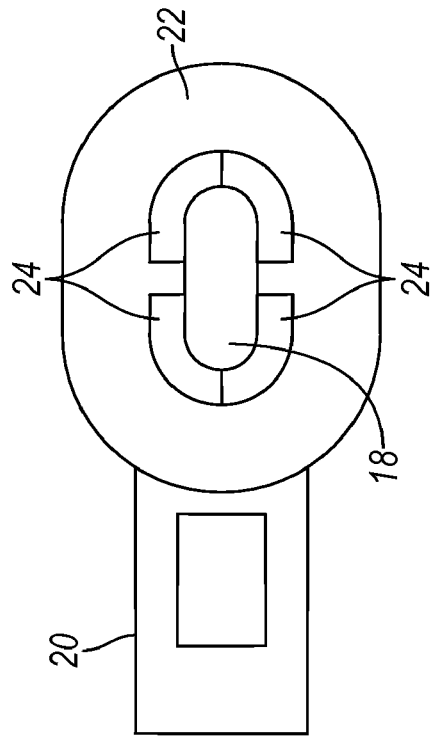
FIG. 4 is a top plan view of the fastener of FIG. 2.
Figure 3:
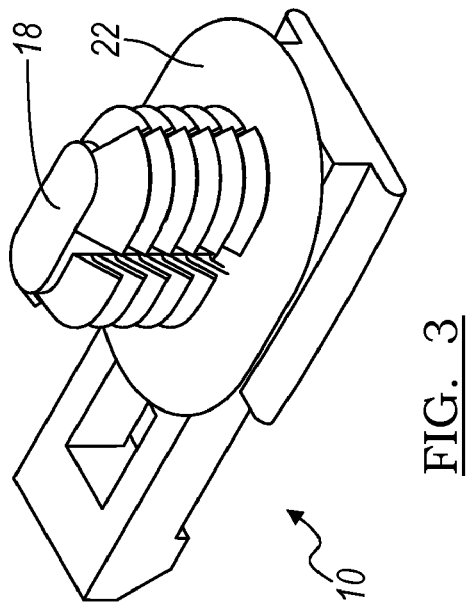
FIG. 3 is a perspective view of the fastener of FIG. 2.

In FIG. 3, the underside of the flange 22 and the details of the fastener 10 are illustrated from the perspective of the base portion 18 towards the head portion 16. The base portion 18 is shown in FIG. 4 along with four arrays of fins 24. Each array 24 contains at least one fin 26 that extends along the perimeter of the base 18 along a peripheral region. The peripheral region here is less than one-fourth of the outer perimeter of the base section 18 as shown. The flange 22 is also depicted with the connector 20.

Figure 6:
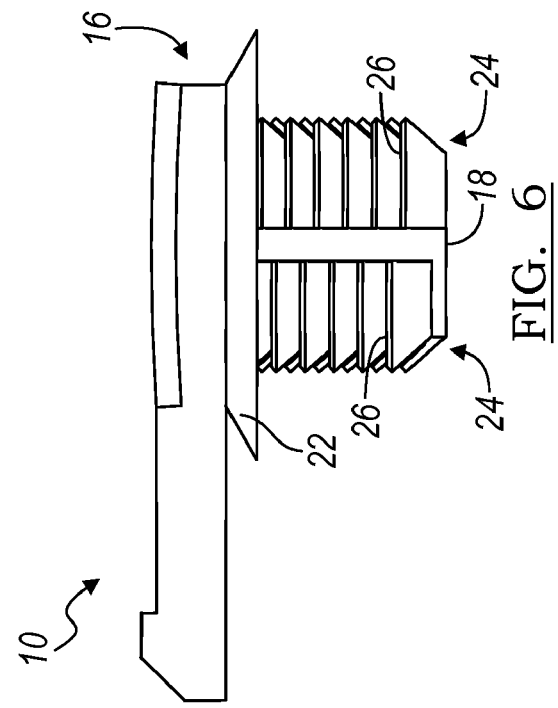
FIG. 6 is a front elevation view of the fastener of FIG. 2.
Figure 5:
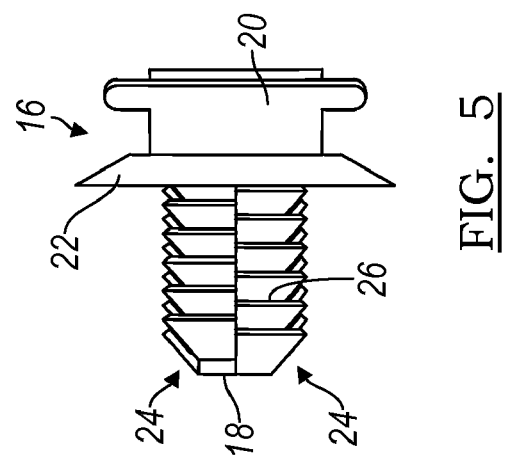
FIG. 5 is a side elevation view of the fastener of FIG. 2.

In FIGS. 5 and 6, the head portion 16 is illustrated connected to the base portion 18 with the flange 22 between the head portion 16 and the base portion 18. A connector 20 is attached to the head portion 16 for attaching an automotive component. The base 18 is shown here having four arrays of fins 24 and primarily depicts the two arrays of fins on the proximate side of the fastener in the figure. The arrays 24 each contains multiple fins 26 with incremental spacing between the fins. The spacing between the fins 26 could also be variable, either increasing or decreasing. The fins 26 of each of the two proximal arrays 24 in the figure are offset axially from one another. A portion of the arrays of fins 24 on the distal side of the fastener can be seen in the figure and have fins 26 that are axially offset from the fins 26 in the adjacent proximal arrays of fins 24. The arrays of fins 24 can be spaced apart from one another and not be directly adjacent to one another, as illustrated in FIG. 6.

Figure 7:
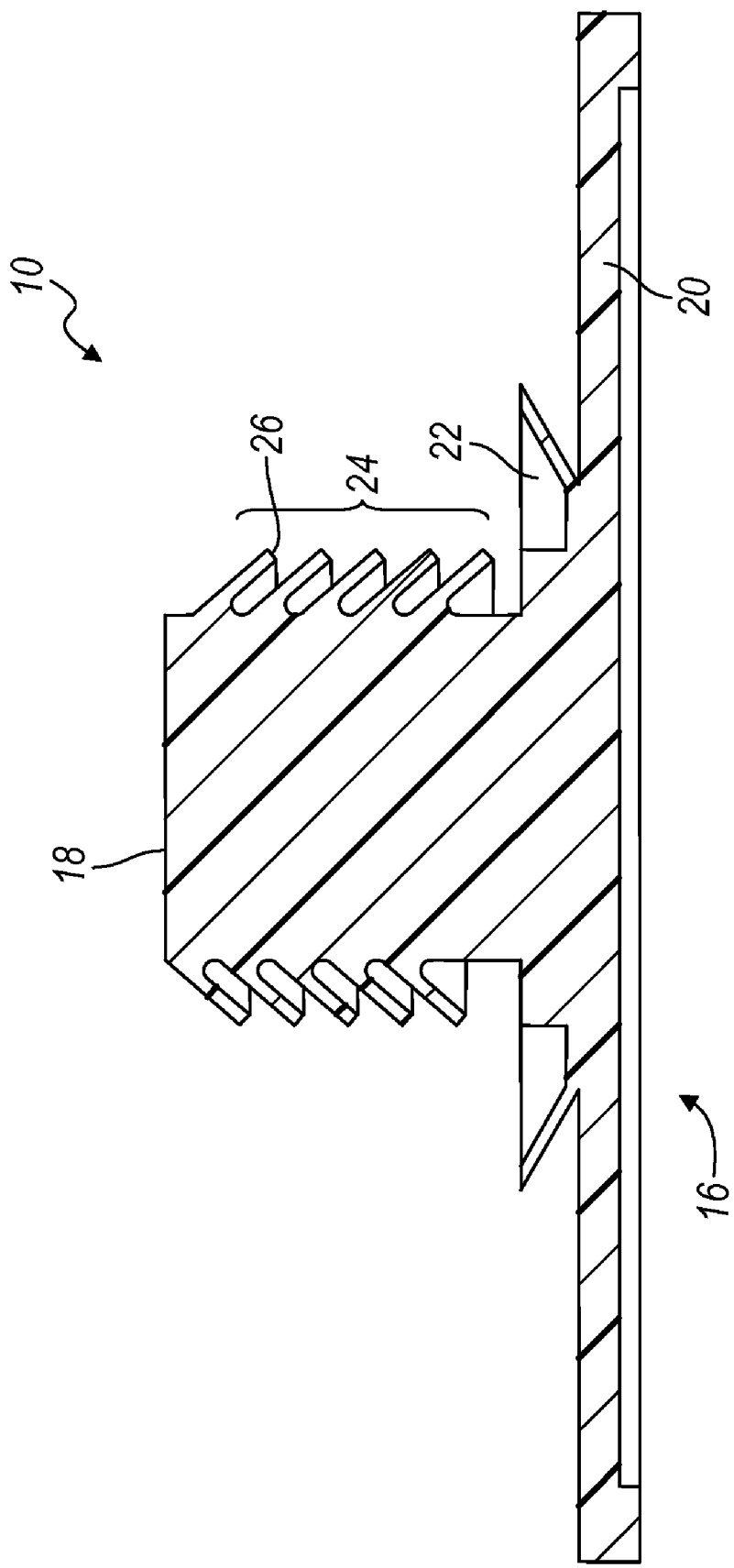
FIG. 7 is a sectional view of a fastener according to another embodiment of the present invention.

Another embodiment of the fastener 10 is illustrated in FIG. 7 with a different connector piece 20 for an automotive component. The connector 20 is used with a wiring bundle or a hose via cable ties. The flange 22 is shown angling outward and away from the head portion 16 while the fins 26 of the arrays 24 are shown angling towards the head portion 16 and outward and away from the base portion 18. Based on orientation of the fins 26 and the flange 22, when the fastener 10 is attached to the panel 12, little movement of the fastener 10 is possible in the longitudinal direction. The flange 22 is compressed against one side of the panel 12 upon insertion of the fastener 10 into the aperture 14, and the fins 26 engage the other side of the panel 12 to both attach the fastener 10 to the panel 12 and retain the compression of the flange 22 against the panel. Also, based on the offset of the fins 26 between adjacent arrays 24, only fins 26 in some of the arrays 24 would interact with the panel surface 12 at any given time upon removal from the aperture 14.

FIG. 8 illustrates a fastener 10 with a different connector 20. The connector 20 on fastener 10 has a straight feature that allows a wiring harness or tubing to be attached to the connector 20 with adhesive directly or an adhesive tape.

The connector 20 on the fastener 10 in FIG. 9 has an offset piece, where the wiring harness or tubing is attached to the fastener 10 at an offset region 30. The offset region 30 is spaced apart from the primary longitudinal axis though the fastener 10. At the offset region 30 of the connector 20, the wiring harness or tubing is attached using either an adhesive directly or via an adhesive tape.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A fastener for insertion into a slotted aperture in an automotive panel, the fastener comprising:
   a head portion for connecting an automotive component to the automotive panel;
   a base extending from the head portion, the base having an elongated cross-section sized to fit within the slotted aperture for limiting rotation of the base within the aperture, the elongated cross-section in a plane perpendicular to a longitudinal axis of the base;
   a first array of fins extending outward from the base and towards the head portion, each fin of the first array extending along a first peripheral region of the base, one fin of the first array of fins being positioned at a distal end of the fastener, the distal end defined by a planar surface and opposed to the head, the one fin extending outward from the planar surface; and
   a second array of fins extending outward from the base and towards the head portion, each fin of the second array extending along a second peripheral region of the base, the second array of fins being offset axially from the first array of fins.

2. The fastener of claim 1 further comprising:
   a third array of fins extending outward from the base and towards the head portion, each fin of the third array extending along a third peripheral region of the base; and
   a fourth array of fins extending outward from the base and towards the head portion, each fin of the fourth array extending along a fourth peripheral region of the base.

3. The fastener of claim 2 wherein the peripheral region of each array of fins corresponds to a quadrant of the base.

4. The fastener of claim 2 wherein the third array of fins is opposed from the first array of fins and the fins of the third array and the first array have corresponding incremental spacing.

5. The fastener of claim 4 wherein the fourth array is offset axially from the first array of fins; and
   wherein the second and fourth arrays of fins are adjacent to the first array of fins.

6. The fastener of claim 5 wherein the offset of the fins is spaced such that only a pair of opposed arrays of fins interact with the panel at a given axial position when extracting the fastener from the aperture in the panel.

7. The fastener of claim 1 further comprising a flange oriented between the head and the base and extending outward for engaging the panel.

8. The fastener of claim 7 wherein the flange is tapered away from the head for being compressed during installation for limiting translation of the fastener in the aperture.

9. The fastener of claim 8 wherein the flange is sized to limit flow of dust and gases through the aperture.

10. The fastener of claim 1 wherein the second array is adjacent to the first array.

11. The fastener of claim 10 wherein the fins of the first array are incrementally spaced.

12. The fastener of claim 11 wherein the second array is offset axially from the first array of fins by half an incremental spacing of the fins of the first array.

13. The fastener of claim 1 wherein the fins in each array extend outward from the axial direction with an incline angle between thirty degrees and sixty degrees.

14. The fastener of claim 1 wherein the head further comprises a connector for an automotive component.

15. The fastener of claim 1 wherein the fastener is provided from a polyamide material; and
   wherein the structure and material of the fastener allows for a minimum lifetime of three insertions and three corresponding extractions from the aperture.

16. An automotive panel assembly comprising:
   a panel having a slotted aperture formed therein; and
   a fastener according to claim 1 for insertion into the slotted aperture;
   wherein upon insertion of the fastener into the slotted aperture of the panel, the fins of at least the first or second array engage the panel.

17. A fastener for insertion into a slotted aperture in an automotive panel, the fastener comprising:

a head portion for connecting an automotive component to the automotive panel;

a base extending from the head portion, the base having an elongated cross-section sized to fit within the slotted aperture to limiting rotation of the base within the aperture, the elongated cross-section in a plane perpendicular to a longitudinal axis of the base, the base having a distal end opposed to the head portion, the distal end defined by a planar surface;

a first array of fins extending outward from the base and towards the head portion, each fin of the first array extending along a first peripheral region of the base, the first peripheral region being less than or equal to half of the perimeter of the base, one fin of the first array of fins extending outward from the planar surface;

a second array of fins extending outward from the base and towards the head portion, each fin of the second array extending along a second peripheral region of the base, the second peripheral region being opposed from and spaced apart from the first peripheral region, one fin of the second array of fins extending outward from the planar surface;

a third array of fins extending outward from the base and towards the head portion, each fin of the third array extending along a third peripheral region of the base, the third peripheral region being located between the first and second peripheral regions, the third array of fins being offset axially from the first array of fins;

a fourth array of fins extending outward from the base and towards the head portion, each fin of the fourth array extending along a fourth peripheral region of the base, the fourth peripheral region being located between the first and second peripheral regions and being opposed from the third peripheral region, the fourth array of fins being offset axially from the first array of fins.

18. The fastener of claim 17 further comprising:

a flange oriented between the head and the base and extending radially outwards for engaging the panel.

* * * * *